No. 656,630. Patented Aug. 28, 1900.
G. W. DAVAULT.
AUTOMATIC GRAZING DEVICE.
(Application filed Jan. 18, 1900.)
(No Model.)
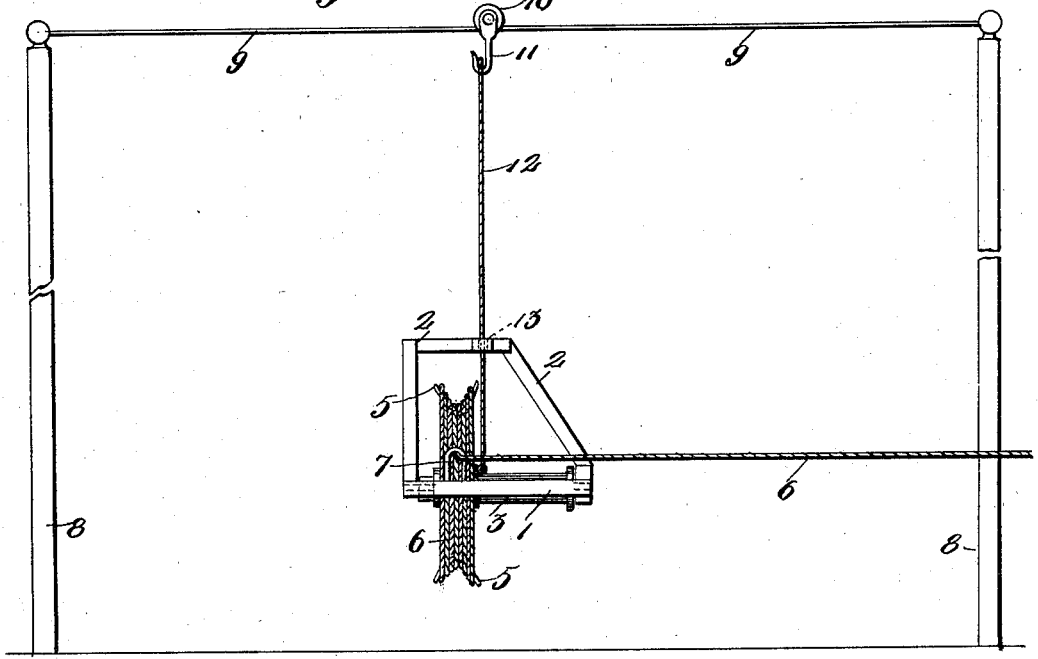
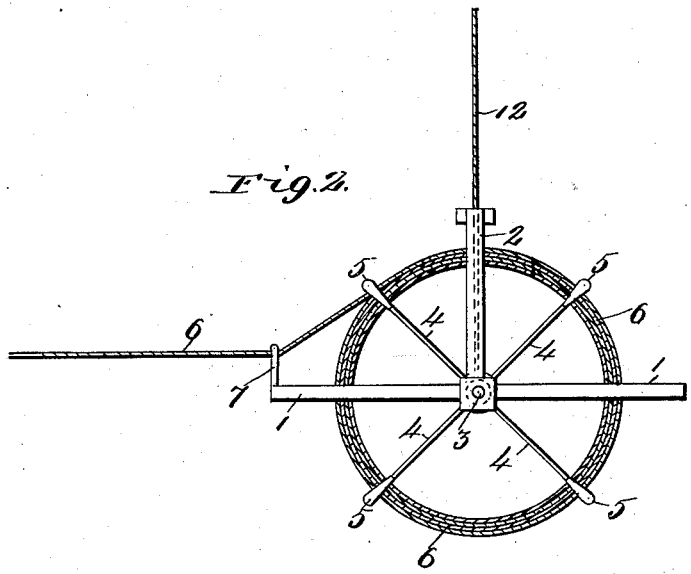
WITNESSES:
INVENTOR
George W. Davault.
BY
ATTORNEYS.

UNITED STATES PATENT OFFICE.

GEORGE W. DAVAULT, OF JACKSON, TENNESSEE.

AUTOMATIC GRAZING DEVICE.

SPECIFICATION forming part of Letters Patent No. 656,630, dated August 28, 1900.

Application filed January 18, 1900. Serial No. 1,913. (No model.)

*To all whom it may concern:*

Be it known that I, GEORGE W. DAVAULT, a citizen of the United States, residing at Jackson, in the county of Madison and State of Tennessee, have invented certain new and useful Improvements in Automatic Grazing Devices; and I do hereby declare the following to be a full, clear, and exact description of the invention, such as will enable others skilled in the art to which it appertains to make and use the same.

My invention relates to improvements in automatic grazing devices; and it consists in the novel combination and arrangement of parts, as will be hereinafter more particularly described and claimed.

In the drawings, Figure 1 is a front elevation of my complete invention, and Fig. 2 is a side elevation of the same.

The object of my invention is to construct a simple and practical automatic grazing device which is of such a nature that the grazing-line will be automatically wound upon a suitable reel as the animal approaches the device; and it consists particularly of a frame, a shaft mounted within the same, a reel fixed to said shaft, consisting of a series of arms the outer ends of which are forked and upon which reel the grazing-line is adapted to be wound, a suitable guide attached to said frame, through which the grazing-line passes for guiding the latter in its proper position upon the reel, a rope one end of which is attached to said shaft and adapted to be wound upon the latter as the grazing-line is unwound from the reel, and suitable means to which the upper end of the rope, which is adapted to be wound upon the shaft, is attached for suspending the said frame and parts accompanying the same.

Referring to the drawings, 1 represents a frame which is provided with an extension 2, which projects upwardly at a right angle from the latter, and mounted within said frame is a shaft 3, having a series of arms 4 fixed to the same and projecting radially therefrom, the said arms terminating in forks 5, which form the outer ends of said arms, the said arms, together with the shaft mounted in the frame, forming a reel upon which the grazing-line 6 is adapted to be wound. One end of the grazing-line 6 is attached to the reel, previously described, the opposite end of the same being attached to the animal in any suitable manner, and passes through a guide 7, fixed to one end of the frame 1, whereby the said line is guided in the proper direction to and from the reel.

As shown in the drawings, two posts 8 are placed in the ground, which are of suitable height, and to the upper ends of the same is attached a trolley-wire 9, and movable upon the latter is a pulley 10, having a depending hook 11, whereby the said pulley is adapted to be moved a suitable distance between the posts 8, and attached to the shaft 3 of the reel is one end of a rope 12, which passes through an opening 13, formed in the extension 2 of the frame 1, said opening and guide being ninety degrees from each other, the upper end of said rope being attached to the hook 11 of the pulley 10.

By the employment and construction of the device as above described the grazing-line when completely wound upon the reel and drawn off of the same by the animal in passing from the frame will turn the shaft 3, and thereby wind the rope 12 upon the latter and at the same time elevate the frame and its parts, and as the animal moves toward the frame the weight of the frame and its parts will cause the reel to be turned, and thereby wind the grazing-line upon said reel. It will therefore be seen that the animal has perfect freedom at a limited distance and the grazing-line will always be automatically wound upon the reel.

I do not limit myself to the employment of the posts and trolley-wire herein shown and described, as it is obvious that the rope 12 may be suspended by any suitable means at the proper distance from the ground.

Having fully described my invention, what I claim is—

An automatic grazing device, comprising a suitable frame, an extension forming a part of the latter, and projecting upwardly at a right angle therefrom, a shaft mounted within said frame, arms projecting radially from said shaft, forks forming the free ends of said arms, a grazing-line, one end of which is attached to the reel thus formed, the opposite end of which is adapted to be attached to the animal, a guide attached to one end of said frame, through which the said grazing-line passes, a rope, one end of which is attached to said shaft, upon which the same is adapted to be wound, and passing through a suitable opening formed in the extension, said opening and guide being ninety degrees from each other, and suitable means to which the last-named rope is attached for suspending the frame, as and for the purpose described.

In testimony whereof I affix my signature in presence of two witnesses.

GEORGE W. DAVAULT.

Witnesses:
W. M. MAY,
C. C. BEAL.